Oct. 9, 1928.
R. E. HALL
1,686,558
FILTRATION OF ALKALINE WATERS
Filed May 3, 1924
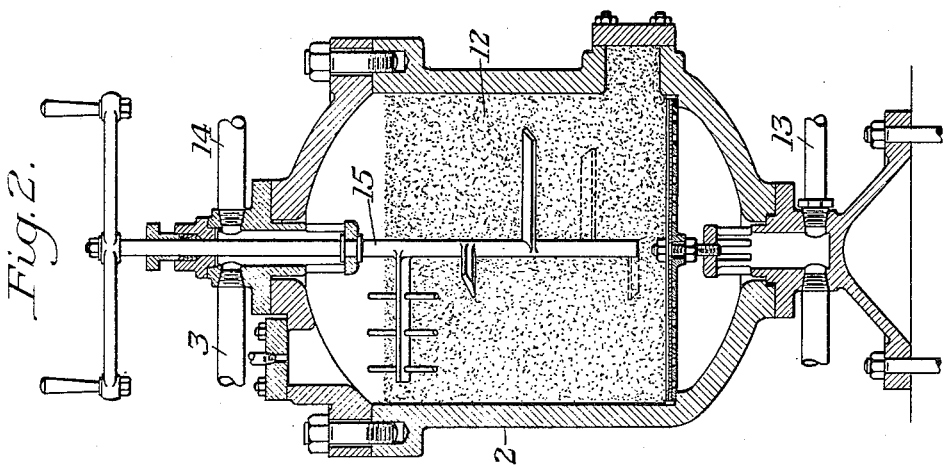
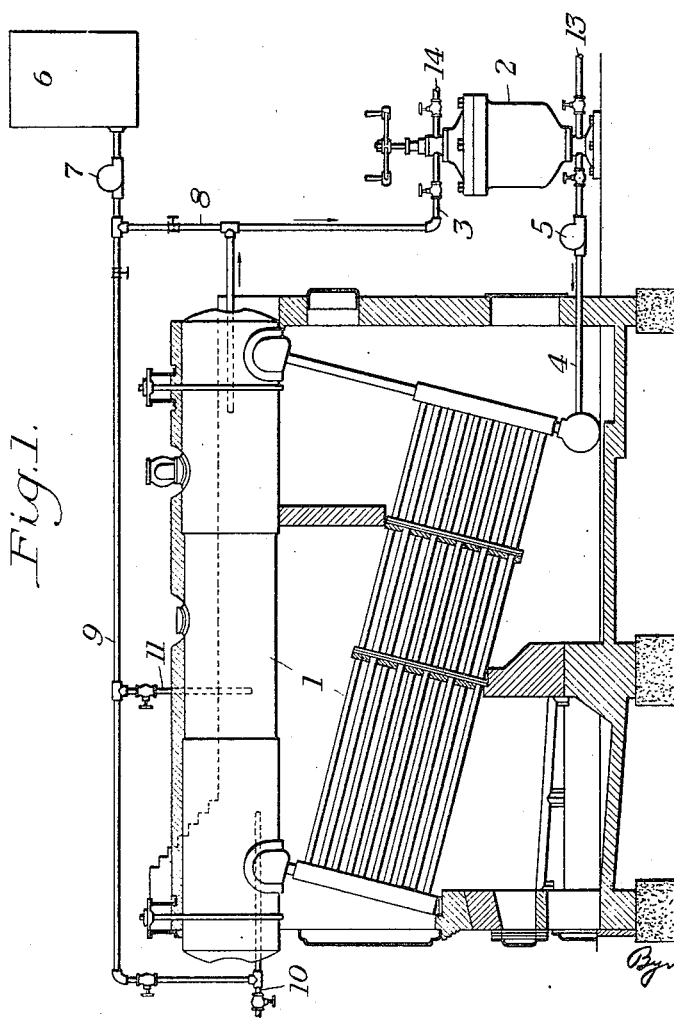
INVENTOR
Ralph E. Hall,
by Patented Oct. 9, 1928.

1,686,558

UNITED STATES PATENT OFFICE.

RALPH E. HALL, OF PITTSBURGH, PENNSYLVANIA, ASSIGNOR TO JOHN M. HOPWOOD, OF DORMONT BOROUGH, PENNSYLVANIA.

FILTRATION OF ALKALINE WATERS.

Application filed May 3, 1924. Serial No. 710,740.

The present invention relates to the filtration of alkaline waters, and more especially to the filtration of the hot alkaline waters encountered in modern steam boiler practice. In conditioning water for steam boilers, and particularly in treating steam boiler water to soften it, alkaline chemicals, such as soda ash or lime or both, are commonly employed. Such treated boiler water is distinctly alkaline, the alkalinity frequently being equivalent to twenty to thirty milliequivalents of sodium carbonate.

In order to remove the sludge which forms in the boiler, due to the concentration of solids incident to evaporation and conditioning, a portion of the water is frequently drawn from the boiler and passed through a sludge removing filter and then returned to the boiler. By thus continuously circulating a small percentage of the water through a filter, the concentration of the insoluble solids may be maintained within desired limits.

Such a treatment of boiler water with an alkaline reagent and the continuous circulation of a portion of the boiler water through a filtering device to remove suspended solids is shown, for example, in my copending application Serial No. 692,804.

The usual water filtering material is sand. Sand consists principally of silica ($SiO_2$). While sand is a satisfactory filtering material for ordinary waters, or even for cold alkaline waters, it is found that the alkaline water which is passed through a filter at the temperatures encountered in modern steam boiler practice, dissolves the sand. The rate of solution of the sand or silica is rather slow, but is sufficient to be perceptible in a relatively short time on a filter in continuous service, filtering the hot alkaline boiler water. Moreover, the silica which is dissolved passes into the boiler as an added impurity in the water.

In the drawings I have indicated the usual arrangement of filter for removing suspended solids from boiler water.

In the drawings:

Figure 1 is an elevation, taken partly in section, through a steam boiler, showing diagrammatically the connection of the filter to the boiler, and Figure 2 is a detail vertical section through the filter.

Referring to the drawings the reference numeral 1 indicates a steam boiler which is supplied with treated water. A quantity of boiler water, say an amount equivalent to say 5 or 10% of the feed water, is continuously circulated through a sludge removing filter 2, being withdrawn from the boiler through the pipe 3 and re-introduced into the boiler through the pipe 4. A pump 5 maintains a continuous circulation through the filter. The boiler water is treated preferably with sodium carbonate, although any of the other usual alkaline treatments may be employed. In the drawings a tank 6 is shown for holding a sodium carbonate solution. The sodium carbonate may be continuously or intermittently pumped from this tank by a pump 7 and introduced through a pipe 8 into the water just prior to its entry into the sludge removing filter 2, or the sodium carbonate may be pumped through a pipe 9 and introduced into the boiler with the feed water through the feed water pipe 10, or may be introduced at any desired place in the boiler through an entirely separate pipe, such as shown, for example, at 11. The filter 2 is shown in more detail in Figure 2. It consists of a casing holding a bed of filtering material 12 through which the boiler water is passed for the removal of the suspended sludge, which usually consists principally of calcium carbonate. The hot boiler water passes downwardly through the filter bed during the filtering operation. In order to wash the filtering material, the filter is periodically shut off from the boiler and washout water is forced upwardly through the filter bed by means of washout pipes 13 and 14. A manually operable agitating device 15 is provided for stirring the filter material during the washout.

Silica sand has heretofore been usually employed as the material for the filter bed 12, but I replace it with a material which is substantially insoluble as compared with the silica sand under the conditions of alkalinity and heat encountered in steam boiler service. Instead of using a material like silica which is an acid anhydride, I employ a material in which the negative or acid radical is neutralized by a basic or positive radical, so that the material does not react like the silica with the hot alkaline boiler water. I prefer to use a silicate having as its positive or basic radical an element with which the boiler water is fully saturated, such, for example, as iron, magnesium or calcium, although other basic radicals may be employed to neutralize the acid radical, which, if existing as an acid anhydride, would tend to dissolve in the hot alkaline boiler water.

The reason for the solution of anhydrides of an acid character, such, for example, as silica in the hot alkaline water, and the inhibition of such solution by a combined basic radical, will be apparent from the following chemical considerations.

Sand consists principally of crystalline silica ($SiO_2$), which is rather strongly acid anhyride. If silica in the solid phase is in contact with a solution containing an alkaline substance, say, for example, sodium hydroxide, the condition may be represented by the following chemical equation:

(1) $SiO_2 \text{(Solid)} \rightleftarrows SiO_2 \text{(dissolved)} + H_2O \rightleftarrows H_2SiO_3 \rightleftarrows 2H^+ + SiO_3^{--}$
$2NaOH \rightleftarrows 2OH^- + 2Na^+$
$\Updownarrow \quad \Updownarrow$
$2H_2O \quad Na_2SiO_3$ At ordinary room temperatures, the equation proceeds from left to right so slowly that the loss of a solid silica filter material is negligible. However, when the temperature is increased to the points encountered in boiler practice, the rate of solution and hydration of the silica is sufficiently great to be no longer negligible.

If, in place of an acid anhydride, a substance is selected for the filtering medium in which the acidic character is already neutralized by a basic radical, and the solubility of which in pure water is low, then the rate of solution in the hot alkaline boiler water is very much less. As a typical example, we may consider the chemical reactions in case an iron silicate ($Fe_2SiO_4$) is employed. The following chemical formula shows the type of equilibrium encountered:

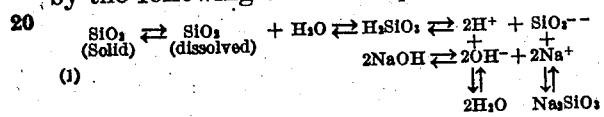

If we follow through the equilibrium from left to right, we note that by increasing the amount of hydroxyl ion in the solution, we will decrease the amount of iron ion by the formation of undissociated iron hydroxide, and thereby accelerate solution, and that by increasing the amount of sodium ion, we tend to form more of the sodium ortho-silicate molecules. However, the ionization of the iron hydroxide, even under these conditions, as compared to that of water, is very large, so that a relatively large amount of iron ion will exist in the solution. Also at equivalent concentrations, the ionization of a salt containing a univalent ion, such as sodium, is always markedly higher than that of a salt with a polyvalent ion, such as iron, consequently the tendency for the iron ion and the silicate ion furnished by the ortho-silicate of iron to be removed from their influence in the equilibrium with the iron silicate by being transformed into undissociated iron hydrate and sodium ortho-silicate is in no wise so large as that for the corresponding ions in equation (1) indicating the equilibrium condition for silica. Moreover, in usual boiler water treatment, the boiler water is fully saturated with respect to iron. A similar equilibrium for a magnesium silicate, such, for example, as forsterite ($Mg_2SiO_4$), belonging to the olivine group of minerals, is indicated by the following equation:

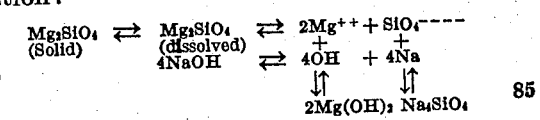

As in the case of iron, the hydrate of magnesium has a very large ionization as compared with water, so that a relatively large amount of magnesium ion will exist in the solution. Moreover, in the usual boiler water treatment, the water is fully saturated with respect to magnesium.

A similar equation might be drawn for a calcium silicate showing that the chemical reactions are such that it will be dissolved in hot alkaline solutions very much more slowly than the acid anhydride silica.

In addition to being very difficultly soluble in hot alkaline boiler water, the material should be capable of being crushed into a sand of grain size suitable for filtering. Also the material should have a relatively high specific gravity to allow a rapid washout. The greater the specific gravity, the more rapidly can washout water be passed upwardly through the filter bed to wash out the sludge.

The preferred material for the filter bed is a granulated smelter slag obtained from copper smelting and having approximately the following composition:

| | Per cent. |
|---|---|
| FeO | 43.24 |
| $SiO_2$ | 38.77 |
| $Al_2O_3$ | 9.46 |
| MgO | 3.01 |
| CaO | 1.72 |
| BaO | .25 |
| ZnO | .63 |
| ZnS | 2.01 |
| CnO | .48 |
| PbO | .15 |
| As | .09 |
| Ni | .04 |

As shown by the formula, this consists principally of silica which is substantially neutralized by the basic iron, the silica probably existing in the form of an iron silicate. The specific gravity of the material is about 3.4. Its rate of solution in the alkaline waters at boiler temperatures is approximately 1/35 of that for silica sand. Another suitable material is crushed forsterite which is magnesium silicate ($Mg_2SiO_4$). Forsterite is one of the olivine group of minerals. It has a specific gravity of about 3 and a solubility in alkaline waters at boiler temperatures of very much less than that of silica.

Other members of the olivine group may be used, and also some members of the pyroxene and amphibole groups of minerals may be used. These have specific gravities of about 3 or over, and are very difficultly soluble in the hot alkaline boiler water. While the negative radical in the minerals used for the filter bed will usually be a silicate or contain a silicate, because of their more ready availability, other minerals may be used in which the negative radical may be other than silicate, such, for example, as ilmenite ($FeTiO_3$) or chromite ($FeCr_2O_4$). Chromite, for example, has a specific gravity of over 4 and its rate of solution in the hot alkaline water is approximately only 1/23 of that of silica.

While I have set forth the best materials known to me as the filtering material, it is to be understood that the invention is not limited to these specific materials, but may be otherwise embodied within the scope of the invention as defined in the broader claims.

I claim:

1. As a filtering medium for hot alkaline boiler waters, an iron silicate.

2. As a filtering medium for hot alkaline boiler waters, granulated smelter slag consisting principally of an iron silicate.

3. As a filtering medium for hot alkaline waters, granulated smelter slag consisting principally of an iron silicate and having a specific gravity of over 3.

4. The process of filtering hot alkaline boiler waters, which consists in passing the heated boiler water through a filter bed consisting principally of a granulated smelter slag composed principally of an iron silicate.

In testimony whereof I have hereunto set my hand.

RALPH E. HALL.